US012229892B2

(12) United States Patent
Jindal et al.

(10) Patent No.: US 12,229,892 B2
(45) Date of Patent: Feb. 18, 2025

(54) VISUALIZING VECTOR GRAPHICS IN THREE-DIMENSIONAL SCENES

(71) Applicant: Adobe Inc., San Jose, CA (US)

(72) Inventors: Ashish Jindal, Tri Nagar (IN); Vineet Batra, Pitam Pura (IN); Sumit Dhingra, Krishna Nagar (IN); Siddhartha Chaudhuri, Bangalore (IN); Nathan Aaron Carr, San Jose, CA (US); Ankit Phogat, Dadri (IN)

(73) Assignee: Adobe Inc., San Jose, CA (US)

( * ) Notice: Subject to any disclaimer, the term of this patent is extended or adjusted under 35 U.S.C. 154(b) by 277 days.

(21) Appl. No.: 18/157,940

(22) Filed: Jan. 23, 2023

(65) Prior Publication Data
US 2024/0249475 A1  Jul. 25, 2024

(51) Int. Cl.
  *G06T 17/20*  (2006.01)
  *G06T 7/80*  (2017.01)
(52) U.S. Cl.
  CPC ............... *G06T 17/20* (2013.01); *G06T 7/80* (2017.01); *G06T 2207/10028* (2013.01); *G06T 2210/56* (2013.01)
(58) Field of Classification Search
  None
  See application file for complete search history.

(56) References Cited

U.S. PATENT DOCUMENTS

| 12,112,409 | B2* | 10/2024 | Wei ................... G06T 11/203 |
| 2007/0052706 | A1 | 3/2007 | Martin |
| 2015/0325044 | A1 | 11/2015 | Lebovitz |
| 2019/0251745 | A1 | 8/2019 | De Goes et al. |
| 2020/0026516 | A1 | 1/2020 | Li et al. |
| 2021/0335026 | A1* | 10/2021 | Phogat ................ G06T 11/203 |
| 2023/0298285 | A1* | 9/2023 | Heinen ................ G06T 15/04 345/419 |
| 2024/0161430 | A1 | 5/2024 | Dhingra et al. |

OTHER PUBLICATIONS

U.S. Appl. No. 18/054,248, "Notice of Allowance", U.S. Appl. No. 18/054,248, filed Sep. 18, 2024, 11 pages.
U.S. Appl. No. 18/054,248, "Non-Final Office Action", U.S. Appl. No. 18/054,248, filed Mar. 14, 2024, 37 pages.
U.S. Appl. No. 18/054,248, "US Application as Filed", U.S. Appl. No. 18/054,248, filed Nov. 10, 2022, 88 pages.

(Continued)

Primary Examiner — Saptarshi Mazumder
(74) Attorney, Agent, or Firm — FIG. 1 Patents

(57) ABSTRACT

In implementations of systems for visualizing vector graphics in three-dimensional scenes, a computing device implements a projection system to receive input data describing a digital image depicting a three-dimensional scene and a vector graphic to be projected into the three-dimensional scene. The projection system generates a depth image by estimating disparity values for pixels of the digital image. A three-dimensional mesh is computed that approximates the three-dimensional scene based on the depth image. The projection system projects the vector graphic onto the digital image by transforming the vector graphic based on the three-dimensional mesh.

20 Claims, 17 Drawing Sheets

(56) References Cited

OTHER PUBLICATIONS

Alhashim, Ibraheem, et al., "High Quality Monocular Depth Estimation via Transfer Learning", Cornell University arXiv, arXiv.org [retrieved Nov. 14, 2022]. Retrieved from the Internet <https://arxiv.org/pdf/1812.11941.pdf>., Mar. 10, 2019, 12 Pages.

Bogdan, Oleksandr, et al., "DeepCalib: a deep learning approach for automatic intrinsic calibration of wide field-of-view cameras", CVMP '18: Proceedings of the 15th Acm Siggraph European Conference on Visual Media Production [retrieved Nov. 15, 2022]. Retrieved from the Internet <10.1145/3278471.3278479>., Dec. 13, 2018, 10 Pages.

Butt, Talha Hanif, "Camera Calibration through Camera Projection Loss", Cornell University arXiv, arXiv.org [retrieved Nov. 15, 2022]. Retrieved from the Internet <https://arxiv.org/pdf/2110.03479.pdf>., Feb. 11, 2022, 5 Pages.

Godard, Clément, et al., "Digging Into Self-Supervised Monocular Depth Estimation", Cornell University arXiv, arXiv.org [retrieved Nov. 15, 2022]. Retrieved from the Internet <https://arxiv.org/pdf/1806.01260.pdf>., Aug. 17, 2019, 18 Pages.

Godard, Clément, et al., "Unsupervised Monocular Depth Estimation with Left-Right Consistency", Cornell University arXiv, arXiv.org [retrieved Nov. 15, 2022]. Retrieved from the Internet <https://arxiv.org/pdf/1609.03677.pdf>., Apr. 12, 2017, 14 Pages.

Laina, Iro, et al., "Deeper Depth Prediction with Fully Convolutional Residual Networks", Cornell University arXiv, arXiv.org [retrieved Nov. 15, 2022-]. Retrieved from the Internet <https://arxiv.org/pdf/1606.00373.pdf>., Sep. 19, 2016, 12 pages.

Liu, Jiwei, et al., "Fully convolutional multi-scale dense networks for monocular depth estimation", IET Computer Vision, vol. 13, No. 5 [retrieved Nov. 15, 2022]. Retrieved from the Internet <https://ietresearch.onlinelibrary.wiley.com/doi/pdf/10.1049/iet-cvi.2018.5645>., Jul. 9, 2019, 8 Pages.

Mahdi, S., et al., "Boosting Monocular Depth Estimation Models to High-Resolution via Content-Adaptive Multi-Resolution Merging", Cornell University arXiv, arXiv.org [retrieved Nov. 15, 2022]. Retrieved from the Internet <https://arxiv.org/pdf/2105.14021.pdf>., May 28, 2021, 10 Pages.

Masoumian, Armin, et al., "Monocular Depth Estimation Using Deep Learning: A Review", Sensors, vol. 22, No. 14 [retrieved Nov. 15, 2022]. Retrieved from the Internet <https://www.mdpi.com/1424-8220/22/14/5353>., Jul. 18, 2022, 24 Pages.

Melvræ, Eivind Lyche, "Geodesic Polar Coordinates on Polygonal Meshes", Computer Graphics Forum, vol. 31, No. 8 [retrieved Nov. 14, 2022]. Retrieved from the Internet <https://www.cs.jhu.edu/~misha/ReadingSeminar/Papers/Melvaer10.pdf>., Dec. 1, 2012, 12 Pages.

Phogat, Ankit, et al., "Skinning vector graphics with GANs", SIGGRAPH '19: ACM SIGGRAPH 2019 Posters [retrieved Nov. 14, 2022]. Retrieved from the Internet <https://doi.org/10.1145/3306214.3338544>, Jul. 28, 2019, 2 Pages.

Ranftl, René, et al., "Towards Robust Monocular Depth Estimation: Mixing Datasets for Zero-shot Cross-dataset Transfer", Cornell University arXiv, arXiv.org [retrieved Nov. 15, 2022]. Retrieved from the Internet <https://arxiv.org/pdf/1907.01341.pdf>., Aug. 25, 2020, 14 Pages.

Ranftl, René, et al., "Vision Transformers for Dense Prediction", Cornell University arXiv, arXiv.org [retrieved Nov. 15, 2022]. Retrieved from the Internet <https://arxiv.org/pdf/2103.13413.pdf>., Mar. 24, 2021, 15 Pages.

Shewchuk, Jonathan Richard, "Triangle: Engineering a 2D quality mesh generator and Delaunay triangulator", Applied Computational Geometry Towards Geometric Engineering. WACG 1996. Lecture Notes in Computer Science, vol. 1148 [retrieved Nov. 15, 2022]. Retrieved from the Internet <http://www.wias-berlin.de/people/si/course/files/Shewchuk96-Triangle.pdf>., Jun. 9, 2004, 10 Pages.

\* cited by examiner

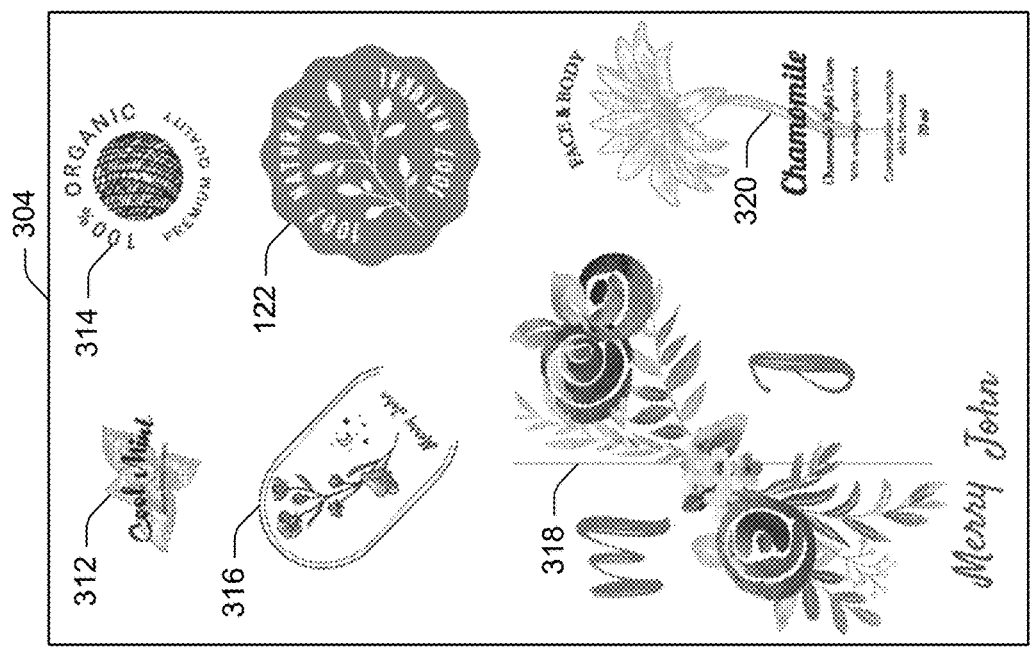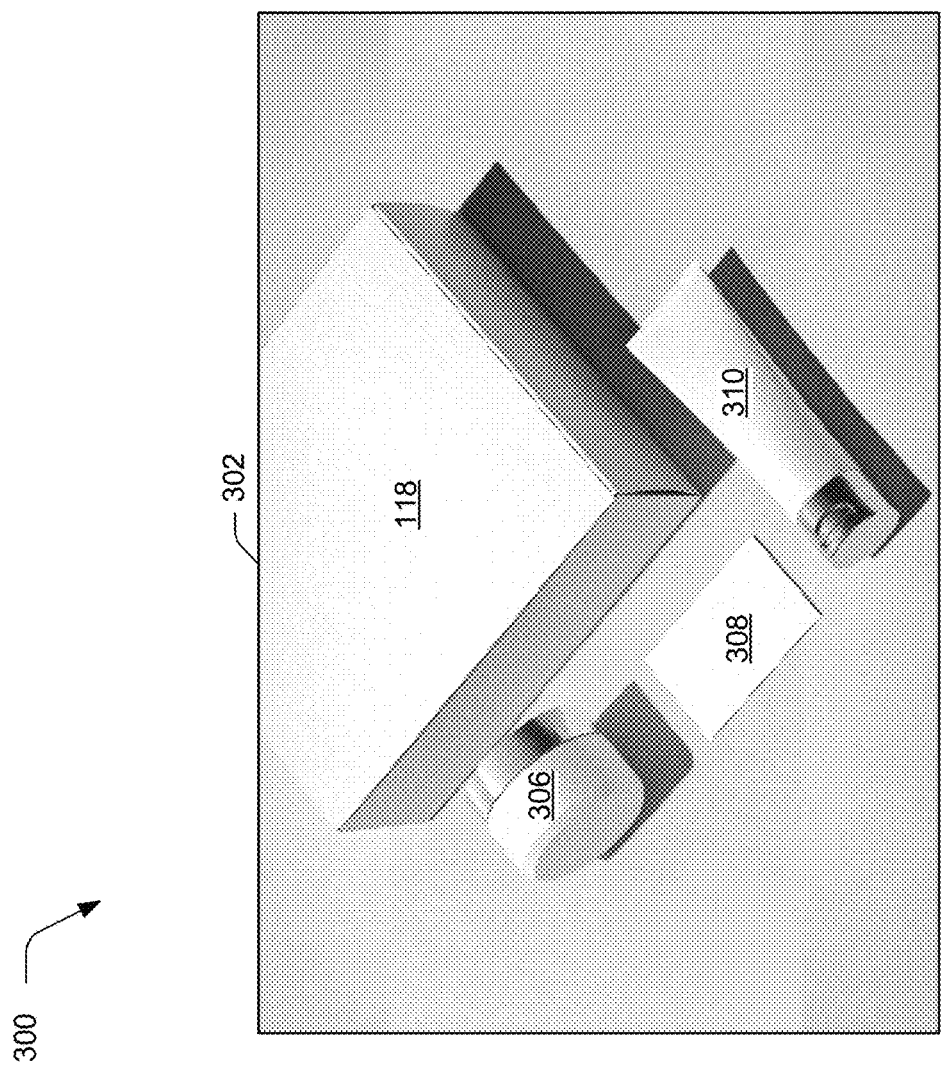
Fig. 3

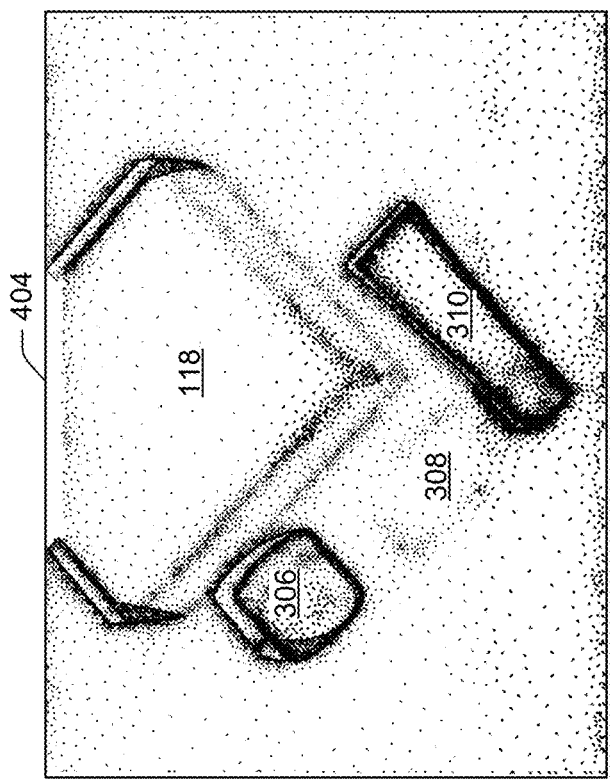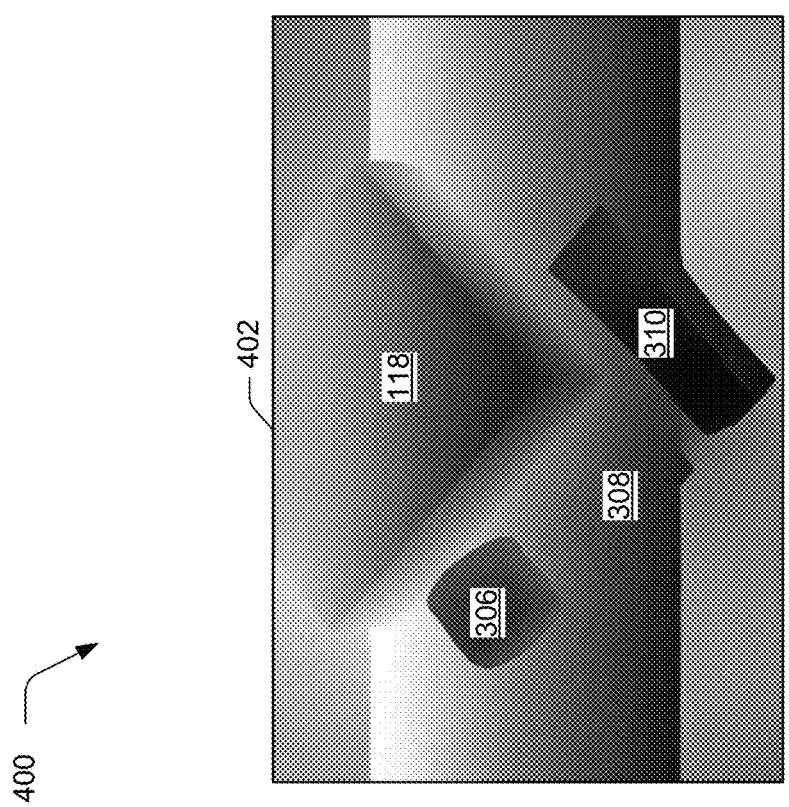
Fig. 4

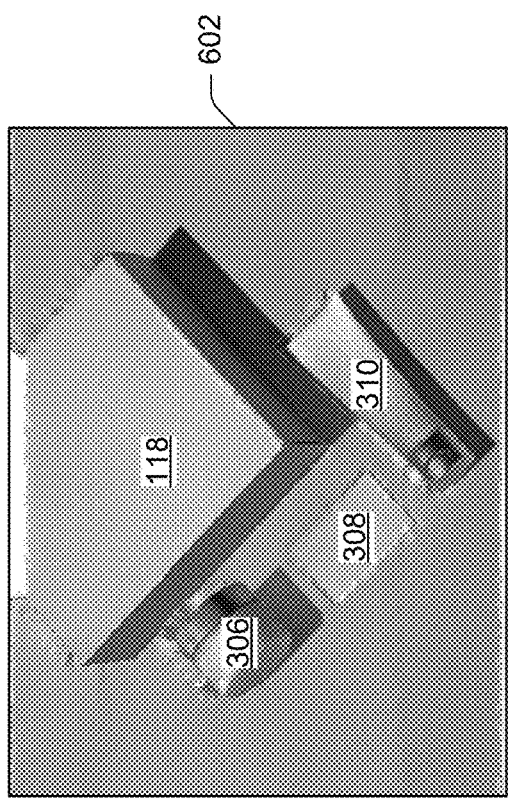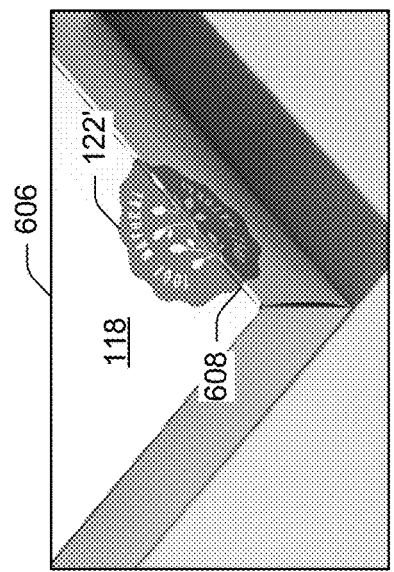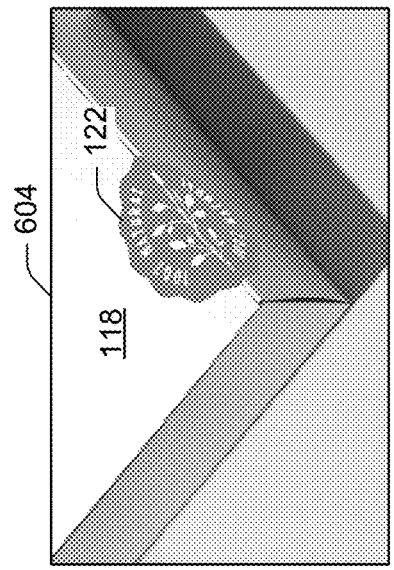
Fig. 6

800

802
Receive input data describing a digital image depicting a three-dimensional scene and a vector graphic to be projected into the three-dimensional scene

804
Generate a depth image by estimating disparity values for pixels of the digital image

806
Compute a three-dimensional mesh that approximates the three-dimensional scene based on the depth image

808
Project the vector graphic onto the digital image by transforming the vector graphic based on the three-dimensional mesh

*Fig. 8*

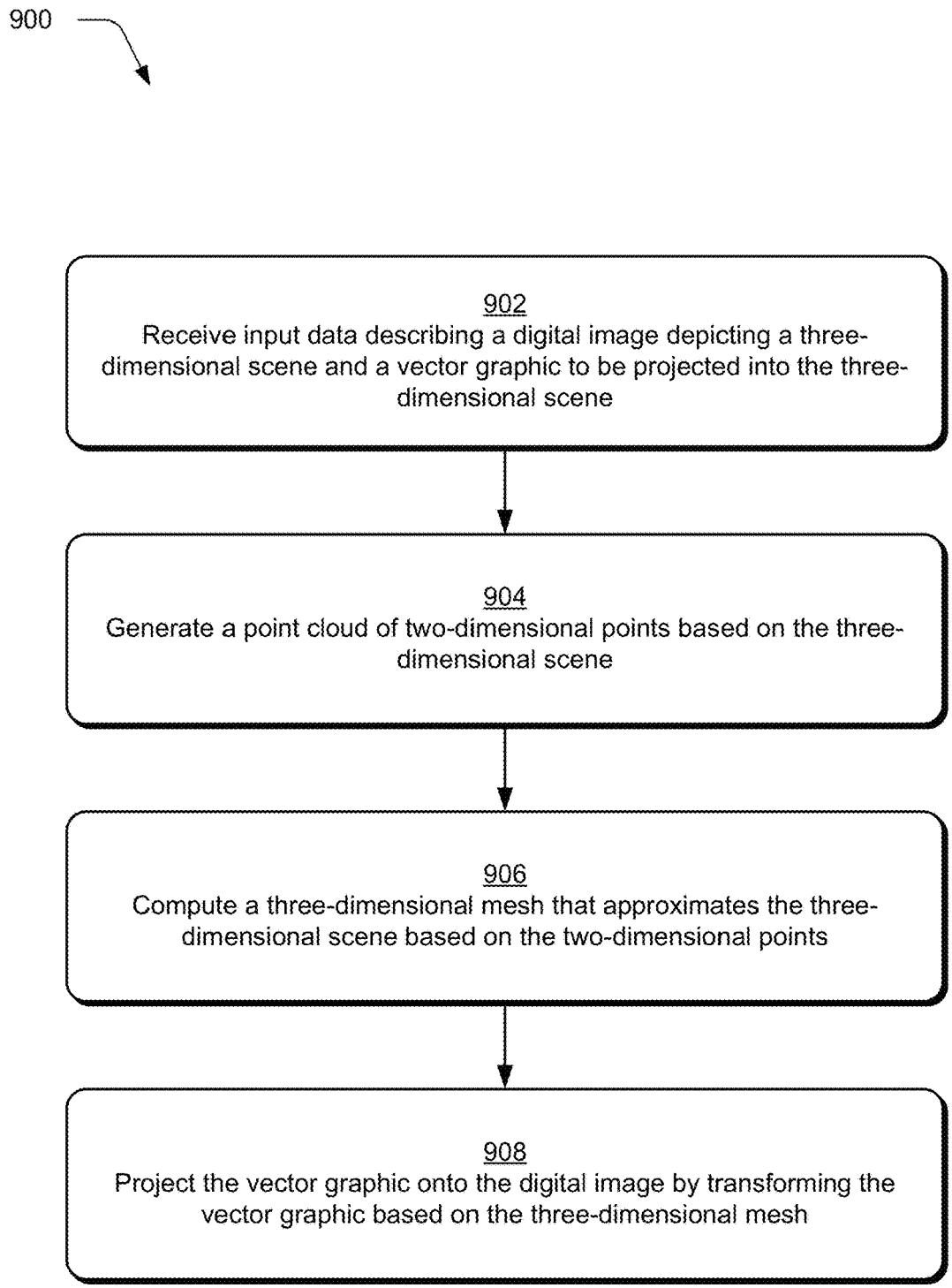

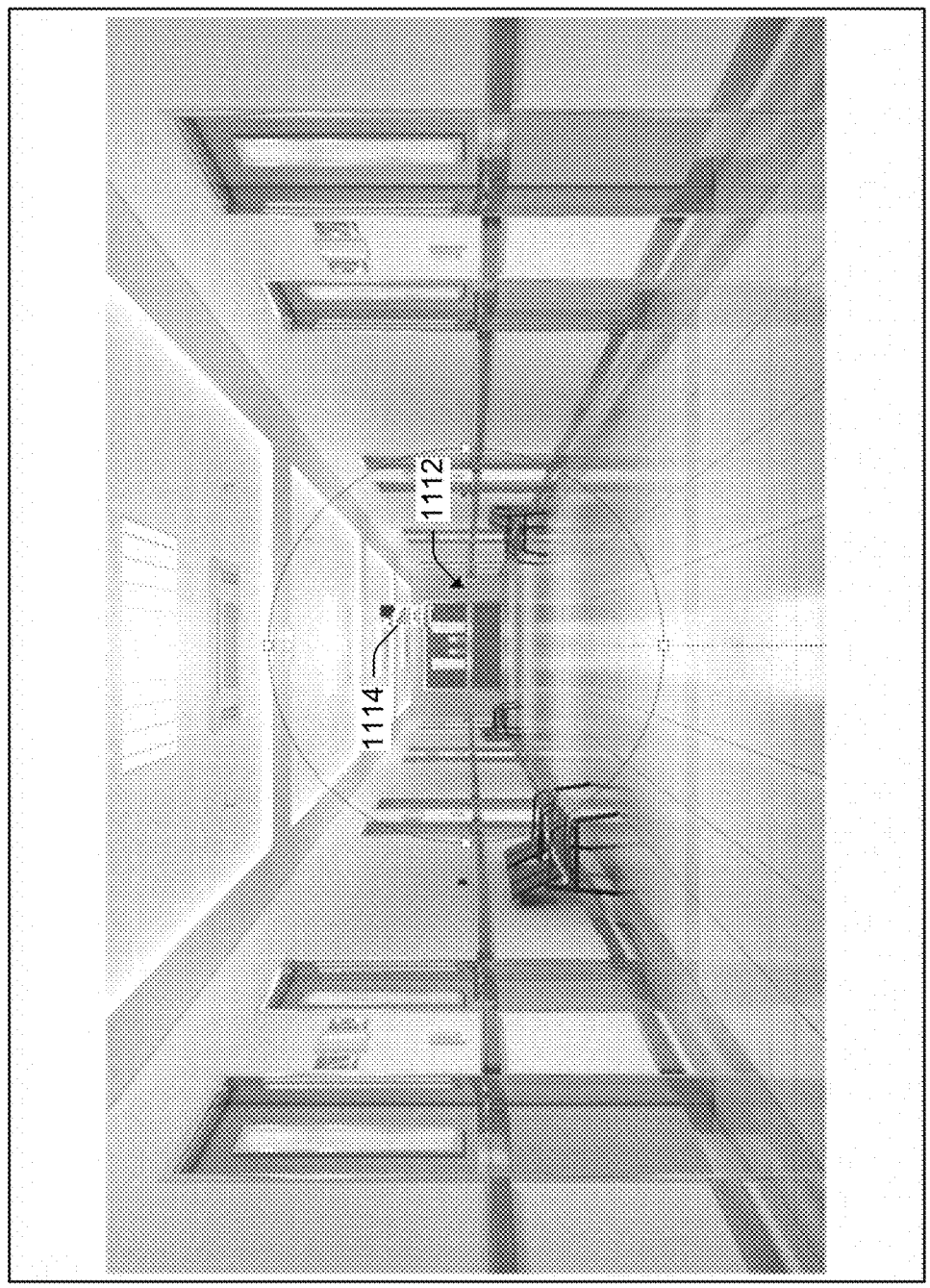

VISUALIZING VECTOR GRAPHICS IN THREE-DIMENSIONAL SCENES

BACKGROUND

Vector graphics are usable to represent a wide variety of content types such as logos, icons, maps, fonts, and so forth. As a result of this versatility and other advantageous properties (e.g., compact representation and resolution independence), vector graphics are also commonly used in designs which are intended to be consumed in the physical word such as labels on products and signs on billboards. In such scenarios, a two-dimensional vector graphic is designed using an application for editing digital content, and the vector graphic is physically printed or fabricated for inclusion on a three-dimensional physical object (e.g., a package for a product).

SUMMARY

Techniques and systems for visualizing vector graphics in three-dimensional scenes are described. In an example, a computing device implements a projection system to receive input data describing a digital image depicting a three-dimensional scene and a vector graphic to be projected into the three-dimensional scene. The projection system generates a depth image by estimating disparity values for pixels of the digital image.

For example, the projection system also estimates camera parameters for the digital image. A three-dimensional mesh is computed that approximates the three-dimensional scene based on the depth image and the estimated camera parameters. The projection system projects the vector graphic onto the digital image by transforming the vector graphic based on the three-dimensional mesh.

This summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 3 illustrates a representation of input data.

FIG. 4 illustrates a representation of a depth image and a point cloud generated based on the depth image.

FIG. 6 illustrates a representation of compositing a vector graphic and a digital image.

FIG. 8 is a flow diagram depicting a procedure in an example implementation in which a three-dimensional mesh is computed based on a depth image.

FIG. 9 is a flow diagram depicting a procedure in an example implementation in which a three-dimensional mesh is computed based on two-dimensional points of a point cloud.

DETAILED DESCRIPTION

Overview

Figure 1:
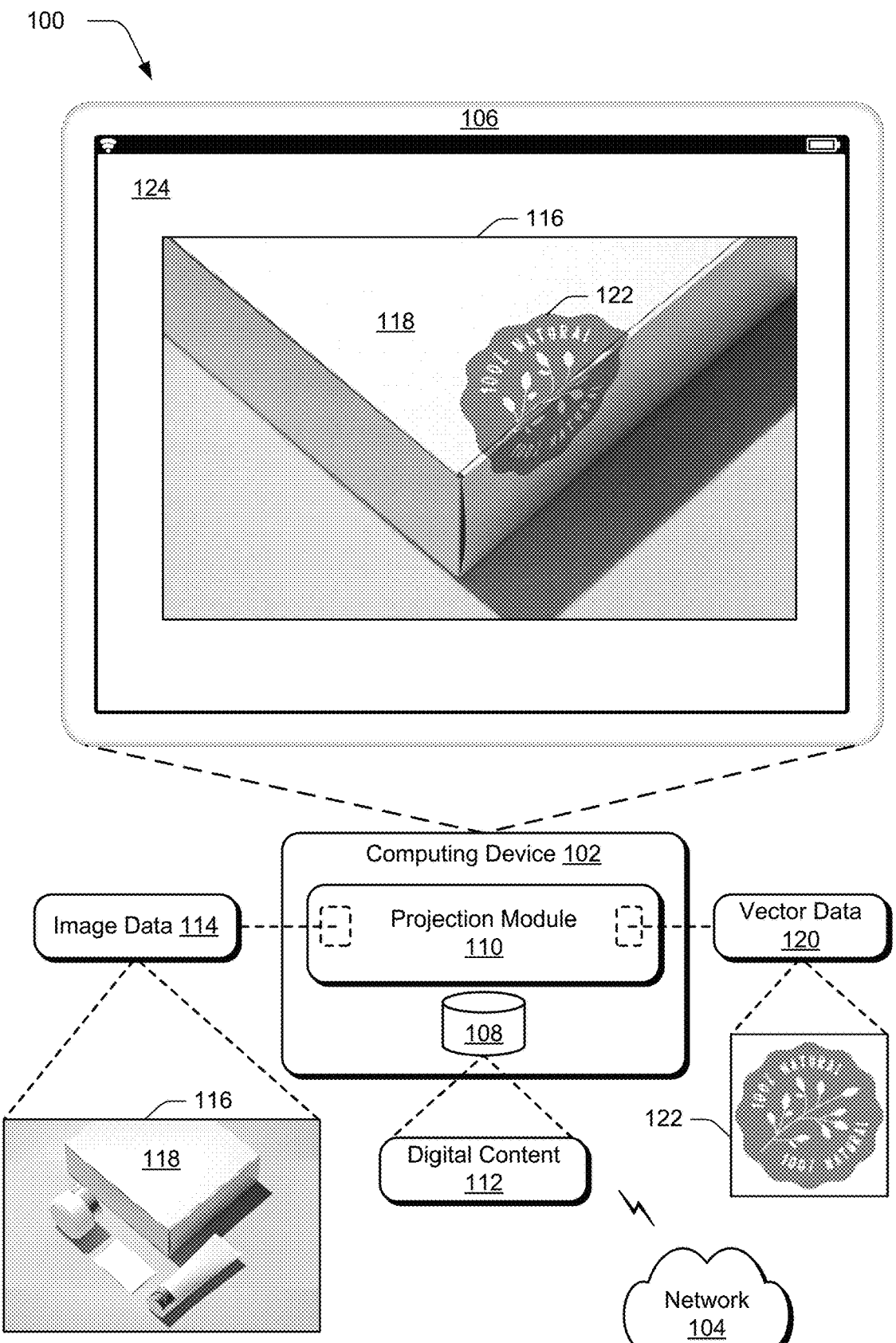
FIG. 1 is an illustration of an environment in an example implementation that is operable to employ digital systems and techniques for visualizing vector graphics in three-dimensional scenes as described herein.

Vector graphics are commonly used in designs which are intended to be consumed in the physical word such as designs for posters, labels, billboards, and so forth. For example, a two-dimensional vector graphic is first designed using an application for editing digital content, and then the vector graphic is physically printed or fabricated for inclusion on a three-dimensional physical object. In this example, the vector graphic is designed as a label to be attached to the three-dimensional object which is a package having a non-planar geometry. In conventional systems, it is not possible to visualize how the two-dimensional vector-based label will appear relative to the three-dimensional package having the non-planar geometry when designing the label. As a result, the printed or fabricated label is likely to appear deformed (e.g., having an undesirable visual feature) when the two-dimensional label is wrapped around the three-dimensional package, for example, based on the package's non-planar geometry.

In order to overcome the limitations of conventional systems, techniques and systems for visualizing vector graphics in three-dimensional scenes are described. For example, a computing device implements a projection system to receive input data describing a digital image depicting a three-dimensional scene and a vector graphic to be projected into the three-dimensional scene. The projection system generates a depth image by estimating disparity values for each pixel of the digital image using a machine learning model.

In one example, the machine learning model includes a neural network based monocular depth estimation model trained on training data to generate disparity values for pixels of digital images. In this example, each disparity value corresponds to a focal length divided by a depth value (assuming a baseline of unity) per pixel. Accordingly, it is possible for the projection system to compute a depth value for a pixel of the digital image using a disparity value for the pixel and a focal length for the pixel.

To do so in one example, the projection system estimates camera parameters for the digital image using an additional machine learning model. For example, the additional machine learning model includes a convolutional neural network trained on training data describing paired images with known camera settings to generate camera parameters for digital images. The projection system implements the additional machine learning model to generate estimated horizontal and vertical fields of view (focal lengths) for the digital image.

The projection system leverages the depth image and the focal lengths to compute a three-dimensional mesh which approximates the three-dimensional scene depicted in the digital image. As part of computing the three-dimensional mesh, the projection system generates a point cloud of two-dimensional points based on the depth image. In order to generate the point cloud of the two-dimensional points, the projection system computes second derivatives of the depth image (along X and Y directions) and adds these together to determine a raw differential density value at each of the pixels of the depth image. The projection system then computes a standard deviation of a local density distribution and normalizes a density map by dividing by the standard deviation.

For instance, after normalizing the density map, the projection system convolves the density map with a Gaussian kernel to estimate a density distribution over larger neighborhoods. The projection system samples the two-dimensional points from the density distribution to generate the point cloud such that an expected number of samples in a neighborhood is proportional to a density in that neighborhood. After generating the point cloud of the two-dimensional points, the projection system assigns coordinates of the two-dimensional points to X and Y coordinates of vertices of the three-dimensional mesh and assigns depth values (e.g., computed using the focal lengths and the disparity values) to Z coordinates of the vertices of the three-dimensional mesh.

Once three-dimensional coordinates (X, Y, Z) are assigned to the vertices, nearby vertices are connectable to form a manifold triangle mesh surface that approximates the three-dimensional scene. In one example, the projection system increases a density of the three-dimensional triangle mesh by performing edge-length based subdivision which subdivides edges of triangles of the mesh that are longer than a threshold length. The projection system projects the vector graphic onto the digital image and uses the three-dimensional triangle mesh to transform the vector graphic based on the three-dimensional scene.

For example, the projection system uses piecewise non-linear transformations to transform the vector graphic relative to the three-dimensional scene depicted by the digital image. In an example, this includes overlaying a geometry of the vector graphic on triangles of the three-dimensional mesh using a UV mapping, determining intersections between the geometry and the triangles in a two-dimensional UV space, and "lifting" vertices of the vector graphic to a surface of the three-dimensional mesh using an inverse of the UV mapping. By transforming the vector graphic in this manner, it is possible to visualize the vector graphic in the three-dimensional scene depicted by the digital image which is not possible in conventional systems.

Further, since the vector graphic is transformed using the piecewise non-linear transformations, the vector graphic retains all of its properties as a vector object such as compact representation and resolution independence. The described systems are capable of projecting the vector graphic (and retaining its properties as a vector object) onto the digital image regardless of whether digital image is a raster-based image (e.g., a digital photograph) or a vector-based image. Additionally, the described systems are capable of selectively transforming graphic vectors relative to three-dimensional scenes such as vertically (e.g., a placard) and horizontally (e.g., a rug or a matt). This functionality is not possible using conventional systems that are not capable of facilitating visualization of vector graphics in three-dimensional scenes.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a projection module 110. For instance, the storage device 108 is illustrated to include digital content 112 such as digital images, digital artwork, digital videos, etc.

The projection module 110 is illustrated as having, receiving, and/or transmitting image data 114. In some examples, the projection module 110 receives the image data 114 via the network 104. For example, a user interacts with an input device (e.g., a mouse, a touchscreen, a keyboard, a stylus, etc.) to transmit the image data 114 to the projection module 110 over the network 104. As shown, the image data 114 describes a digital image 116 which depicts a three-dimensional scene that includes a three-dimensional package 118.

In a first example, the digital image 116 is a raster-based image such as a digital photograph of the three-dimensional scene. In a second example, the digital image 116 is a vector-based image and the three-dimensional package 118 is a vector object. In either example, the projection module 110 receives and processes the image data 114 to estimate depth values (or disparity values) for pixels of the digital image 116. To do so in one example, the projection module 110 leverages a machine learning model.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In one example, the machine learning model includes a neural network based monocular depth estimation model trained on training data to generate a disparity value for each pixel of an input digital image (e.g., the digital image 116). Each disparity value corresponds to a focal length divided by a depth value (assuming a baseline of unity) per pixel. For example, it is possible to convert a disparity value for a pixel to a depth value for the pixel by estimating a focal length for the pixel. In this example, the projection module 110 generates a depth image (e.g., a disparity image) by processing the image data 114 using the machine learning model trained on the training data to generate the disparity values for pixels of digital images.

The depth image (e.g., the disparity image) indicates the generated disparity values for each pixel of the digital image 116 which the projection module 110 uses along with estimated camera parameters for the digital image 116 to generate a three-dimensional mesh that approximates the three-dimensional scene depicted in the digital image 116. In order to estimate the camera parameters for the digital image 116, the projection module 110 leverages an additional machine learning model such as a convolutional neural network trained on training data describing pairs of digital images with known or labeled camera parameters/settings to generate camera parameters (e.g., focal lengths for pixels) of an input digital image (e.g., the digital image 116). For example, the projection module 110 implements the additional machine learning module to generate estimated horizontal and vertical fields of view (e.g., focal lengths) for the digital image 116.

As part of generating the three-dimensional mesh, the projection module 110 generates a point cloud of two-dimensional points based on the depth image (e.g., the disparity image). To do so in one example, the projection module 110 computes second derivatives of the depth/disparity image (e.g., along X and Y axes) and adds them together to determine a raw differential density value at each of the pixels of the depth/disparity image. In this example, the projection module 110 computes a standard deviation of a local density distribution and normalizes a density map (e.g., by dividing by the computed standard deviation).

For example, the projection module 110 convolves the density map with a Gaussian kernel to estimate density (e.g., a density distribution) over larger neighborhoods. The projection module 110 samples the two-dimensional points from the density distribution with an expected number of samples in a neighborhood proportional to a density in that neighborhood. In some examples, in order to obtain a smoother distribution with more uniformly separated two-dimensional points, the projection module 110 uses Lloyd's algorithm to perform multiple iterations of Lloyd's relaxation.

Consider an example in which the projection module 110 leverages the camera parameters (e.g., focal lengths) estimated for the digital image 116 using the additional machine learning model and the two-dimensional points included in the point cloud to compute the three-dimensional mesh that approximates the three-dimensional scene depicted by the digital image 116. In this example, the projection module 110 uses Delaunay triangulation to triangulate the two-dimensional points included in the point cloud and assigns three-dimensional coordinates to vertices of the three-dimensional mesh. For instance, the projection module 110 assigns X and Y coordinates of the two-dimensional points to the vertices and assigns (e.g., negative) Z coordinates to the vertices by converting a corresponding disparity value to a depth value using the estimated camera focal length (assuming a baseline of unity). Assigning the three-dimensional coordinates to the vertices results in a triangle mesh which approximates the three-dimensional scene depicted by the digital image 116 that includes the three-dimensional package 118.

In order to increase a density of the triangle mesh (e.g., increase a number of triangles), the projection module 110 performs edge-length based subdivision on the triangle mesh such that for each triangle of the mesh, a number of subdivisions performed on each edge is proportional to its length. This subdivision also increases uniformity and quality of the triangles. However, the projection module 110 does not subdivide small edges (less than a threshold length) which avoids numerical instability caused by small floating-point values and preserves an overall quality of the mesh. The projection module 110 uses the subdivided three-dimensional mesh to represent the three-dimensional scene depicted by the digital image 116 for transforming vector objects described by vector data 120.

The projection module 110 is illustrated as having, receiving, and/or transmitting the vector data 120. For example, the user interacts with the input device to transmit the vector data 120 to the projection module 110 via the network 104. As shown in FIG. 1, the vector data 120 describes a vector graphic 122 that depicts a label having text stating "100% NATURAL" and a small tree branch. The projection module 110 receives and processes the vector data 120 to transform the vector graphic 122 based on the three-dimensional mesh. To do so in one example, the projection module 110 displays the digital image 116 in a user interface 124 of the display device 106 such that the digital image 116 is aligned with the three-dimensional mesh which is not displayed in the user interface 124.

For example, the user manipulates the input device relative to the user interface 124 to specify two-dimensional coordinates (e.g., screen coordinates) of the digital image 116 for displaying the vector graphic 122, and the projection module 110 converts the two-dimensional screen coordinates into three-dimensional coordinates in a camera coordinate system. The projection module 110 casts a ray from a current camera position in a direction of the three-dimensional coordinates and uses an intersection point between the ray and the three-dimensional mesh to compute a UV mapping for the mesh surface around the intersection point (e.g., using an exponential map). In an example, the projection module 110 overlays a geometry of the vector graphic 122 on mesh triangles in the two-dimensional UV space, and adds new vertices to subdivide paths of the vector graphic 122 where the paths intersect boundaries of the mesh triangles. The projection module 110 then clips away vector graphic 122 regions overlapping occluded triangles of the mesh; "lifts" all vertices of the vector graphic 122 back to the mesh surface using an inverse of the UV mapping (e.g., an inverse UV mapping); and then projects these vertices to a screen space (e.g., two-dimensional screen coordinates) using appropriate camera transformations.

For instance, the projection module 110 applies piecewise non-linear transformations to the vector graphic 122 which causes the vector graphic 122 to appear deformed in the user interface 124 based on the three-dimensional mesh; however, the projection module 110 does not rasterize the vector graphic 122 in some examples. Instead, the vector graphic 122 retains its properties as a vector object such as scalability, resolution independence, compact representation, and so forth. As shown, the vector graphic 122 appears to fold or wrap around a portion of the three-dimensional package 118 in the user interface 124.

Consider an example in which the user designs the vector graphic 122 to be physically applied to the three-dimensional package 118 (e.g., the vector graphic 122 is to be printed or fabricated and then attached to the three-dimensional package 118). In this example, the user captures the digital image 116 depicting the three-dimensional scene using an image capture device (e.g., a digital camera), and the user interacts with the input device relative to the user interface 124 to understand how the two-dimensional vector graphic 122 appears in relation to the three-dimensional package 118. For example, if a transformed appearance of the vector graphic 122 is not acceptable to the user, then the user is capable of modifying the vector graphic 122 and understanding how the modified vector graphic 122 appears relative to the three-dimensional package 118 before physically printing or fabricating the vector graphic 122.

Figure 2:
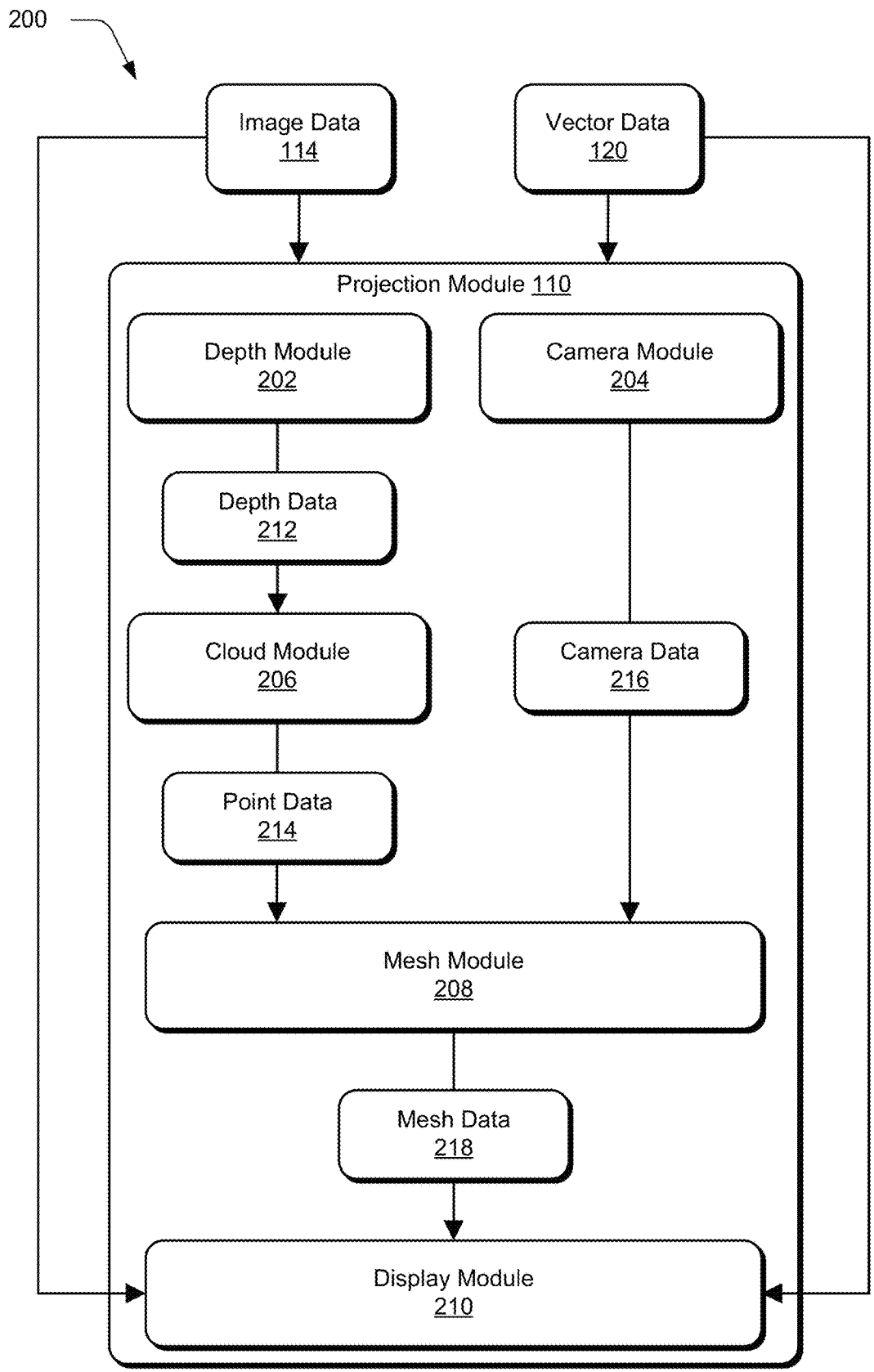
FIG. 2 depicts a system in an example implementation showing operation of a projection module for visualizing vector graphics in three-dimensional scenes.

FIG. 2 depicts a system 200 in an example implementation showing operation of a projection module 110. The projection module 110 is illustrated to include a depth module 202, a camera module 204, a cloud module 206, a mesh module 208, and a display module 210. For example, the projection module 110 receives the image data 114 and the vector data 120 as inputs.

FIG. 3 illustrates a representation 300 of input data. For instance, the representation 300 includes a digital image 302 which depicts a three-dimensional scene and vector objects 304 to be projected into the three-dimensional scene. In an example, the image data 114 describes the digital image 302 and the vector data 120 describes the vector objects 304. As shown in FIG. 3, the three-dimensional scene depicted by the digital image 302 includes the three-dimensional package 118, a three-dimensional cosmetic containing jar 306, a three-dimensional card 308, and a three-dimensional cosmetic containing tube 310. The vector objects 304 are illustrated to include the vector graphic 122; a vector graphic 312 (which is a label depicting a mint leaf and text stating "Cool Mint"); a vector graphic 314 (which is a label depicting text stating "100% ORGANIC" and "PREMIUM QUALITY"); a vector graphic 316 (which is a label depicting a plant); a vector graphic 318 (which is a label depicting roses); and a vector graphic 320 (which is a label depicting a flower and text stating "FACE & BODY").

In an example, the depth module 202 receives and processes the image data 114 describing the digital image 302 to generate depth data 212. FIG. 4 illustrates a representation 400 of a depth image 402 and a point cloud 404 generated based on the depth image 402. For instance, the depth module 202 generates the depth image 402 by estimating disparity values for each pixel of the digital image 302. In an example in which the digital image 302 is a digital photograph captured using an image capture device (e.g., a camera) with sensors capable of measuring depth values, then the depth module 202 is capable of estimating the disparity values for each pixel of the digital image 302 using data describing depth values measured by the sensors.

In other examples, the depth module 202 estimates the disparity values for each pixel of the digital image 302 using the machine learning model that includes the neural network based monocular depth estimation model trained on training data to generate disparity values for pixels of input digital images such as the digital image 302. In these examples, the neural network based monocular depth estimation model is trained on the training data to generate disparity values based on a single input image. Because of this training, the machine learning model is capable of generating disparity values for pencil drawn sketches, oil paintings, vector-based images depicting vector objects, and so forth.

Consider an example in which the depth module 202 generates the disparity values for the pixels of the digital image 302 using the machine learning model such that each disparity value corresponds to a focal length divided by a depth value (assuming a baseline of unity) per pixel. For example, the depth module 202 is capable of computing a depth value for a pixel of the digital image 302 by dividing a focal length associated with the pixel by a disparity value generated for the pixel. In this example, the depth module 202 computes the depth value for the pixel of the digital image 302 based on the disparity value generated for the pixel; however, it is to be appreciated that the depth module 202 is also capable of computing the depth value for the pixel directly (e.g., without generating the disparity value for the pixel) in other examples. The depth module 202 generates the depth image 402 as indicating the disparity values for each pixel of the digital image 302 generated using the machine learning model that includes the neural network based monocular depth estimation model. For instance, the depth module 202 generates the depth data 212 as describing the depth image 402 and the cloud module 206 receives and processes the depth data 212 to generate point data 214.

In order to generate the point data 214 in one example, the cloud module 206 generates a point cloud of two-dimensional points based on the depth image 402 such that a relative density of the two-dimensional points included in the point cloud is greater where the depth image 402 indicates a greater variation in depth of the three-dimensional scene depicted by the digital image 302. The cloud module 206 computes second derivatives of the depth image 402 (e.g., along X and Y axes) and adds them together to determine a raw differential density value at each pixel of the depth image 402. For example, the cloud module 206 computes a standard deviation of a local density distribution and normalizes a density map (e.g., by dividing by the computed standard deviation). In this example, the cloud module 206 convolves the density map with a Gaussian kernel to estimate density (e.g., a density distribution) over larger neighborhoods.

The cloud module 206 samples the two-dimensional points from the density distribution with an expected number of samples in a neighborhood proportional to a density in that neighborhood. In an example, in order to obtain a smoother distribution with more uniformly separated two-dimensional points, the cloud module 206 uses Lloyd's algorithm to perform multiple iterations of Lloyd's relaxation. The cloud module 206 generates the point data 214 as describing the point cloud 404 after performing the iterations of Lloyd's relaxation.

For example, the camera module 204 receives the image data 114 as describing the digital image 302 and the camera module 204 processes the image data 114 to generate camera data 216. In order to generate the camera data 216 in one example, the camera module 204 estimates camera parameters (e.g., focal lengths for pixels) for the digital image 302. In the example in which the digital image 302 is the digital photograph captured using the image capture device, it is possible that the image data 114 describes the camera parameters for the digital image 302 (e.g., the image data 114 includes exchangeable image file data). However, it is also possible that the image data 114 describes camera parameters for the digital image 302 which are not accurate, e.g., if the digital image 302 has been manipulated or cropped.

Since any camera parameters for the digital image 302 described by the image data 114 are potentially inaccurate, the camera module 204 processes the image data 114 using the additional machine learning model that includes the convolutional neural network trained on training data describing paired digital images with known camera settings/parameters to generate camera parameters (e.g., focal lengths) of an input digital image. For example, the camera module 204 implements the additional machine learning module to generate estimated horizontal and vertical fields of view (e.g., focal lengths) for the digital image 302. The camera module 204 generates the camera data 216 as describing camera parameters (e.g., focal lengths) for the digital image 302 output by the additional machine learning model.

Figure 5:
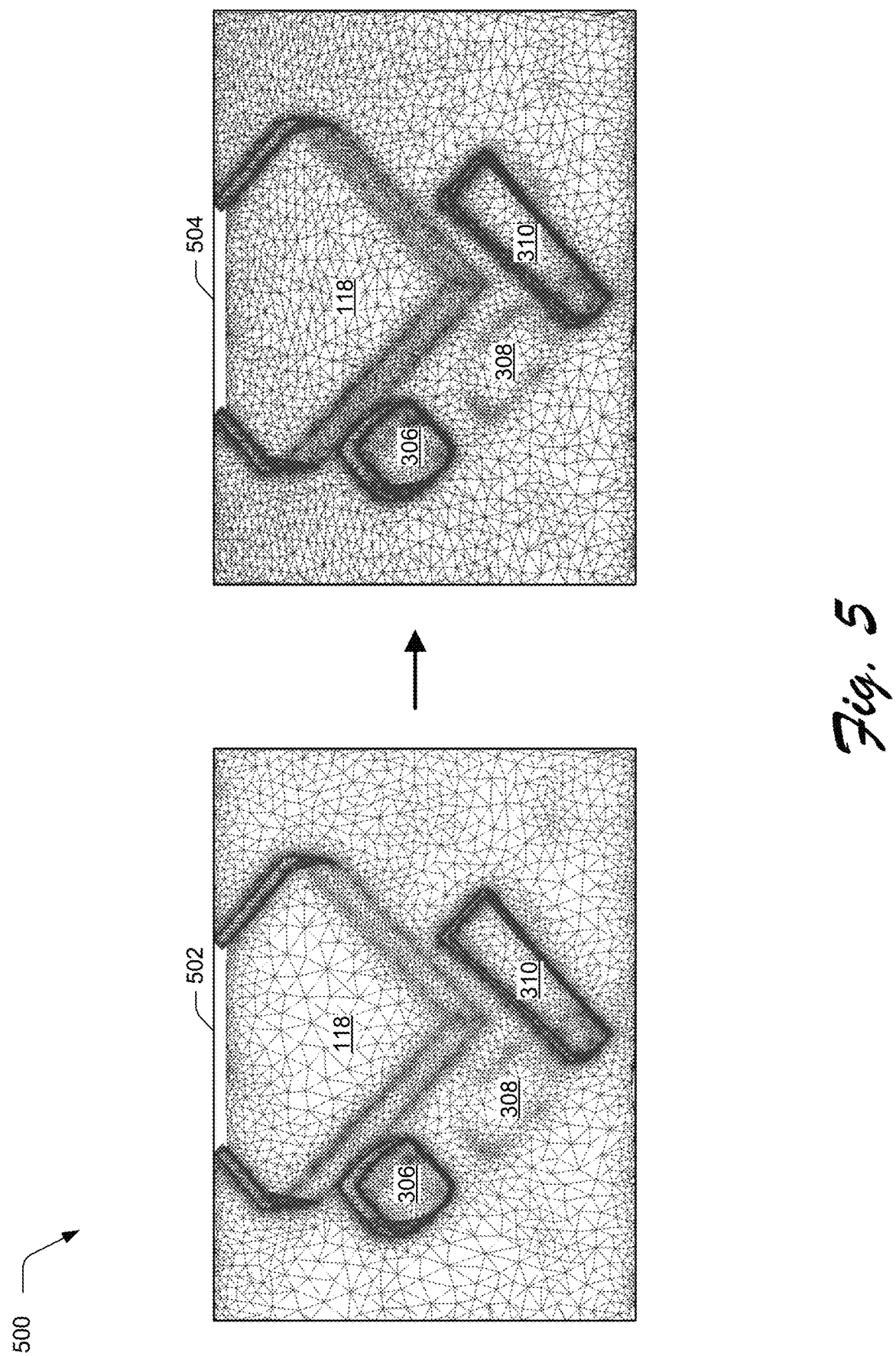
FIG. 5 illustrates a representation of generating a three-dimensional mesh.

The mesh module 208 receives the point data 214 describing the point cloud 404 and the camera data 216 describing the camera parameters for the digital image 302, and the mesh module 208 processes that point data 214 and/or the camera data 216 to generate mesh data 218. For example, the mesh module 208 leverages the point cloud 404 and the camera parameters (e.g., focal lengths) to compute a three-dimensional triangle mesh that approximates the three-dimensional scene depicted by the digital image 302. Although the three-dimensional mesh is described as a triangle mesh in this example, it is to be appreciated that in other examples, the mesh module 208 computes the three-dimensional mesh as a quadrilateral mesh, a polygon mesh, and so forth. FIG. 5 illustrates a representation 500 of generating a three-dimensional mesh.

For example, the mesh module 208 uses Delaunay triangulation to triangulate the two-dimensional points included in the point cloud 404 and assigns three-dimensional coordinates to vertices of a three-dimensional triangle mesh 502. In this example, the mesh module 208 assigns X and Y coordinates of the two-dimensional points to the vertices and assigns (e.g., negative) Z coordinates to the vertices by converting a corresponding disparity value to a depth value using the estimated camera focal length described by the camera data 216 (assuming a baseline of unity). Assigning the three-dimensional coordinates to the vertices results in the three-dimensional triangle mesh 502 which approximates the three-dimensional scene depicted by the digital image 302 that includes the three-dimensional package 118, the three-dimensional cosmetic containing jar 306, the three-dimensional card 308, and the three-dimensional cosmetic containing tube 310.

In order to increase a density of the three-dimensional triangle mesh 502 (e.g., increase a number of triangles), the mesh module 208 performs edge-length based subdivision on the three-dimensional triangle mesh 502 such that for each triangle of the mesh 502, a number of subdivisions performed on each edge is proportional to its length. For instance, the edge-length based subdivision increases uniformity and quality of the triangles. The mesh module 208 generates a subdivided three-dimensional mesh 504 which has a greater triangle density than the three-dimensional triangle mesh 502. When generating the subdivided three-dimensional mesh 504; however, the mesh module 208 does not subdivide small edges (less than a threshold length) which avoids numerical instability caused by small floating-point values and preserves an overall quality of the mesh. The mesh module 208 generates the mesh data 218 as describing the subdivided three-dimensional mesh 504.

FIG. 6 illustrates a representation 600 of compositing a vector graphic and a digital image. The display module 210 receives the mesh data 218, the image data 114, and the vector data 120. For instance, it is possible for the display module 210 to process the mesh data 218 describing the subdivided three-dimensional mesh 504 and the image data 114 describing the digital image 302 to generate a texture image 602 by rendering the subdivided three-dimensional mesh 504 using the digital image 302 as a texture. However, as shown in FIG. 6, the texture image 602 includes undesirable visual artifacts. In one example, rather than transforming the vector objects 304 for display relative to the texture image 602, the display module 210 projects the vector objects 304 onto the digital image 302 and transforms the vector objects 304 using the subdivided three-dimensional mesh 504.

For instance, the display module 210 renders the digital image 302 and projects the vector graphic 122 onto the digital image 302. As shown in a first example 604, the display module 210 transforms the vector graphic 122 using the subdivided three-dimensional mesh 504 such that the vector graphic 122 appears to wrap around a portion of the three-dimensional package 118. In the first example 604, the three-dimensional package 118 and the vector graphic 122 appear as separate visual objects. In order to cause the three-dimensional package 118 and the vector graphic 122 to appear seamlessly integrated, the display module 210 composites the vector graphic 122 and the digital image 302 by applying a multiply blend mode to the vector graphic 122 which is illustrated in a second example 606. As shown in the second example 606, the applied multiply blend mode causes the three-dimensional package 118 and the vector graphic 122' to appear seamlessly integrated. For instance, the vector graphic 122' appears to blend into a seam 608 formed at an interface between sides of the three-dimensional package 118. Although the second example 606 is described as illustrating the vector graphic 122 and the digital image 302 composited using a multiply blend mode, it is to be appreciated that in other examples the vector graphic 112 and the digital image 302 are composited using other blending/mixing modes or without performing a blending/mixing operation. In one of these other examples, the vector graphic 122 and the digital image 302 are composited by performing a lighting separation operation which separates lighting from a diffuse surface color and then replaces the surface color and the lighting (e.g., via "intrinsic image" decomposition into a shading and a material). In some of these other examples, the vector graphic 122 and the digital image 302 are composited using another machine learning model (e.g., a neural network) trained on training data to composite vector graphics and digital images.

Figure 7:
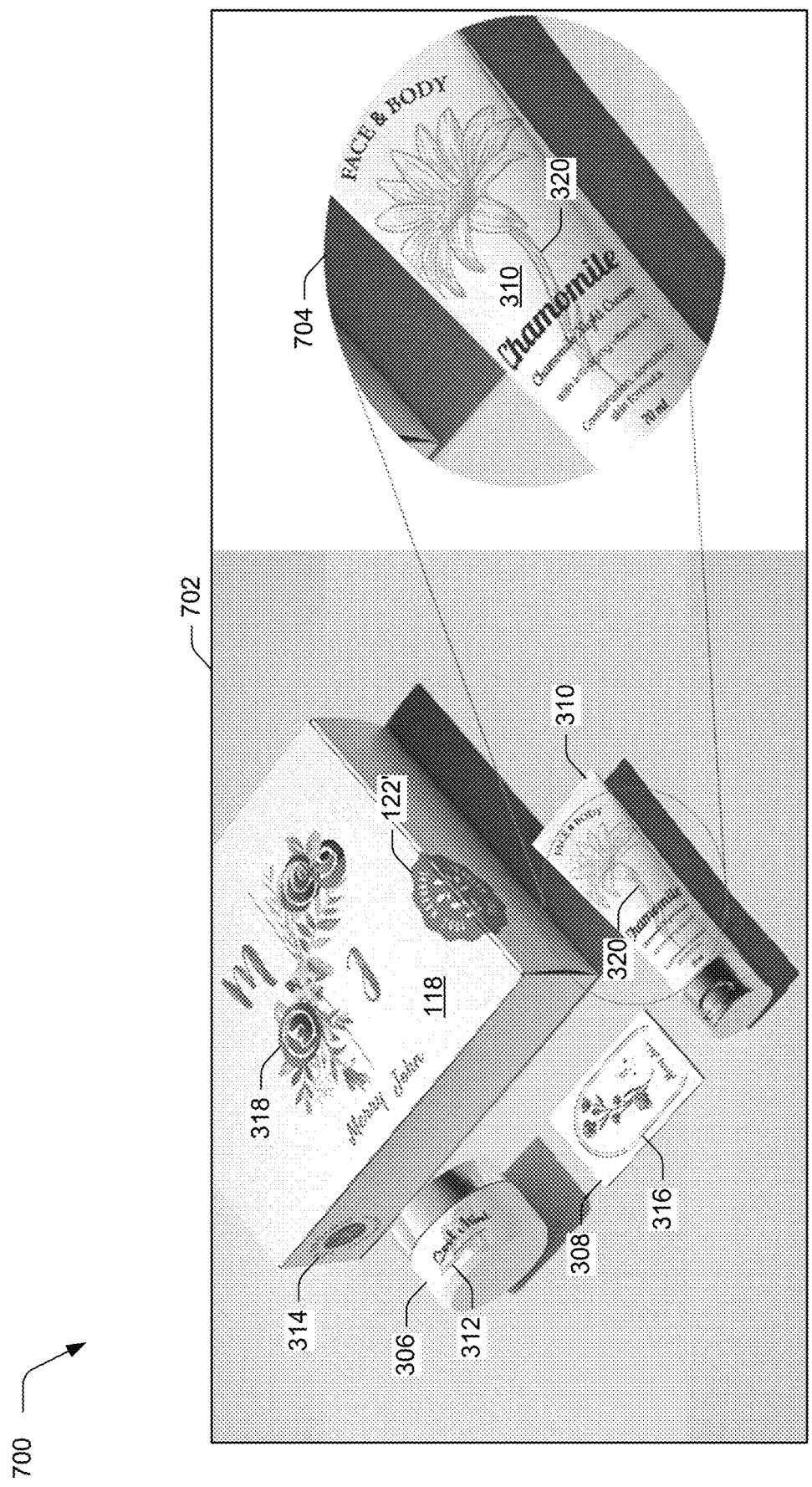
FIG. 7 illustrates a representation of visualizing vector graphics in a three-dimensional scene.

FIG. 7 illustrates a representation 700 of visualizing vector graphics in a three-dimensional scene. The representation 700 includes a rendering 702 which the display module 210 renders for display in the user interface 124 of the display device 106. For example, before the display module 210 displays the rendering 702, the display module 210 displays the digital image 302 and the vector objects 304 in the user interface 124. In this example, the display module 210 displays the digital image 302 in the user interface 124 such that the digital image 302 is aligned with the subdivided three-dimensional mesh 504 which is not displayed in the user interface 124. A user interacts with an input device (e.g., a stylus, a touchscreen, a mouse, a keyboard, etc.) relative to the user interface 124 to indicate two-dimensional coordinates (e.g., screen coordinates) of the digital image 302 for displaying the vector objects 304.

For example, the display module 210 converts each set of the two-dimensional coordinates indicted by the user into three-dimensional coordinates in a camera coordinate system. The display module 210 then casts a ray from a current camera position in a direction of each of the three-dimensional coordinates in the camera coordinate system, and uses intersection points between the rays and the subdivided three-dimensional mesh 504 to compute a UV mapping for the mesh surface around each of the intersection points (e.g., using an exponential map).

In an example, the display module 210 overlays a geometry of the vector graphic 122' on mesh triangles in the two-dimensional UV space, and then adds new vertices to subdivide paths of the vector graphic 122' where the paths intersect boundaries of the mesh triangles. Continuing the example, the display module 210 clips away vector graphic 122' regions overlapping occluded triangles of the subdivided three-dimensional mesh 504; "lifts" all vertices of the vector graphic 122' back to the surface of the subdivided three-dimensional mesh 504 using an inverse of the UV mapping (e.g., an inverse UV mapping); and then projects these vertices to a screen space (e.g., two-dimensional screen coordinates) using appropriate camera transformations. The display module 210 repeats the processes described for the vector graphic 122' for each of the vector graphics 312-320.

For instance, the display module 210 applies piecewise non-linear transformations to the vector graphic 122' which causes the vector graphic 122' to appear deformed in the user interface 124 based on the subdivided three-dimensional mesh 504. However, the display module 210 does not rasterize the vector graphic 122' which retains its properties as a vector object such as scalability, resolution independence, compact representation, and so forth. As shown, the vector graphic 122' appears to fold or wrap around a portion of the three-dimensional package 118 in the user interface 124.

Similarly, the display module 210 applies piecewise non-linear transformations to the vector graphic 312 and causes the vector graphic 312 to wrap around the three-dimensional cosmetic containing jar 306 in the user interface 124. The display module 210 transforms the vector graphic 314 such that the transformed vector graphic 314 appears to be attached to a side of the three-dimensional package 118 without rasterizing the vector graphic 314. For example, the display module 210 applies piecewise non-linear transformations based on the subdivided three-dimensional mesh 504 to the vector graphic 316, the vector graphic 318, and the vector graphic 320. As shown, the vector graphic 316 appears attached to the three-dimensional card 308; the vector graphic 318 appears attached to a top of the three-dimensional package 118; and the vector graphic 320 appears attached to the three-dimensional cosmetic containing tube 310. Notably, the display module 210 does not rasterize the vector graphics 312-320 which retain their properties as vector objects. This is illustrated for the vector graphic 320 in an enlarged view 704 included in the rendering 702. In the enlarged view 704, small text depicted by the vector graphic 320 does not appear pixelated and instead appears legible because the vector graphic 320 is resolution independent as a vector object.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7. FIG. 8 is a flow diagram depicting a procedure 800 in an example implementation in which a three-dimensional mesh is computed based on a depth image.

Input data is received describing a digital image depicting a three-dimensional scene and a vector graphic to be projected into the three-dimensional scene (block 802). For example, the computing device 102 implements the projection module 110 to receive the input data. A depth image is generated by estimating disparity values for pixels of the digital image (block 804). The projection module 110 generates the depth image in one example.

A three-dimensional mesh is computed that approximates the three-dimensional scene based on the depth image (block 806). In some examples, the projection module 110 computes the three-dimensional mesh that approximates the three-dimensional scene. The vector graphic is projected onto the digital image by transforming the vector graphic based on the three-dimensional mesh (block 808). In an example, the computing device 102 implements the projection module 110 to project the vector graphic onto the digital image.

FIG. 9 is a flow diagram depicting a procedure 900 in an example implementation in which a three-dimensional mesh is computed based on two-dimensional points of a point cloud. Input data is received describing a digital image depicting a three-dimensional scene and a vector graphic to be projected into the three-dimensional scene (block 902). In one example, the projection module 110 receives the input data.

A point cloud of two-dimensional points is generated based on the three-dimensional scene (block 904). The computing device 102 implements the projection module 110 to generate the point cloud of two-dimensional points in an example. A three-dimensional mesh is computed that approximates the three-dimensional scene based on the two-dimensional points (block 906). For example, the projection module 110 computes the three-dimensional mesh.

The vector graphic is projected onto the digital image by transforming the vector graphic based on the three-dimensional mesh (block 908). In an example, the computing device 102 implements the projection module 110 to project the vector graphic onto the digital image.

Figure 10:
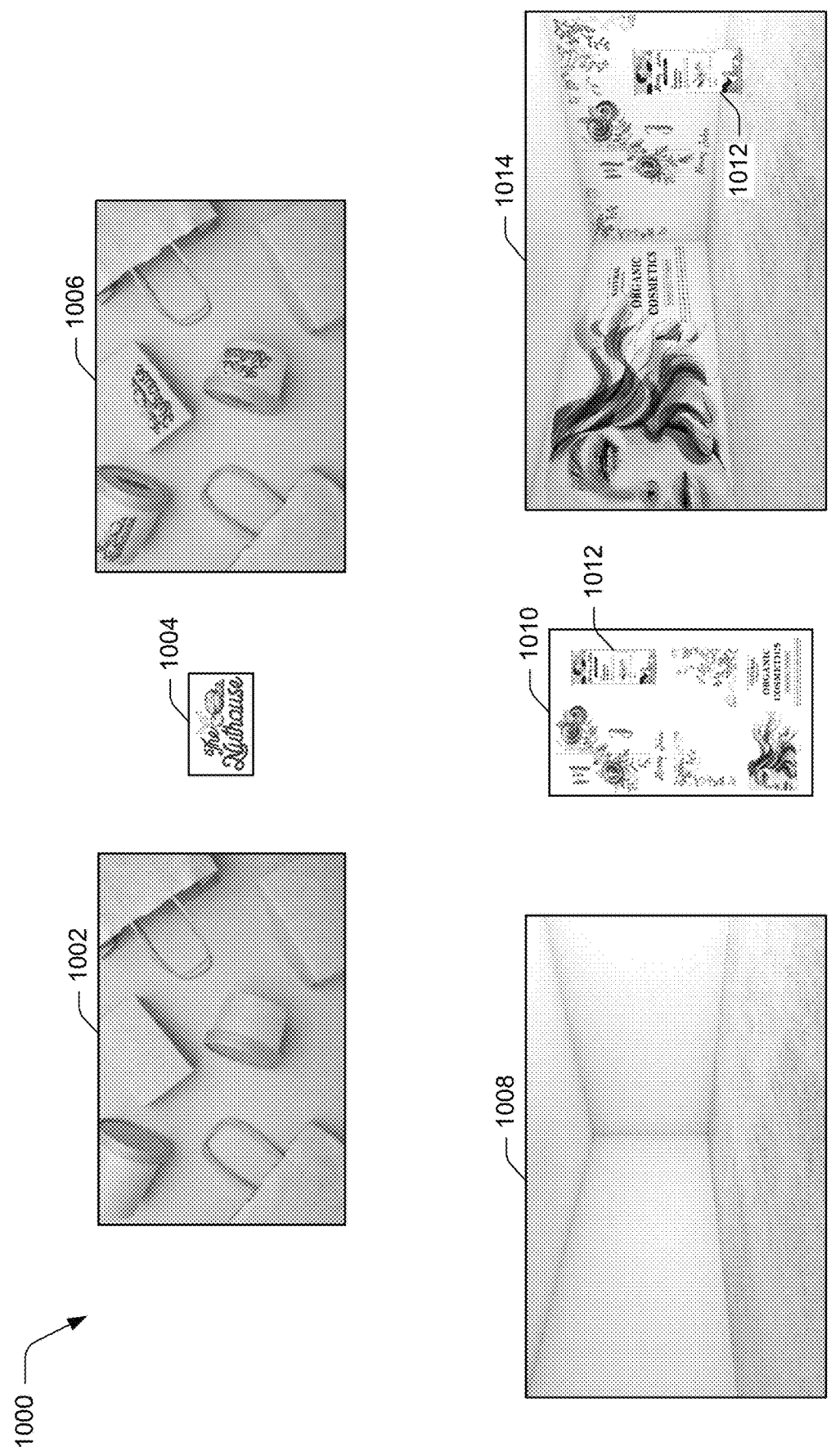
FIG. 10 illustrates a representation of examples of visualizing vector graphics in three-dimensional scenes.

FIG. 10 illustrates a representation 1000 of examples of visualizing vector graphics in three-dimensional scenes. For example, the projection module 110 receives input data describing a first digital image 1002 depicting a first three-dimensional scene and a vector object 1004. In this example, the projection module 110 generates a three-dimensional mesh that approximates the first three-dimensional scene by estimating disparity values for pixels of the first digital image 1002 and estimating camera parameters for the first digital image 1002. The projection module 110 generates a rendering 1006 for display in the user interface 124 by projecting the vector object 1004 onto the first digital image 1002 and transforming the vector object 1004 based on the three-dimensional mesh that approximates the first three-dimensional scene. For instance, the projection module 110 transforms the vector object 1004 using a piecewise non-linear transformation that does not rasterize the vector object 1004.

In another example, the projection module 110 receives input data describing a second digital image 1008 depicting a second three-dimensional scene and a group of vector graphics 1010 that includes a vertical vector graphic 1012. As shown, the vertical vector graphic 1012 depicts a placard. The projection module 110 generates a three-dimensional mesh that approximates the second three-dimensional scene by estimating disparity values for pixels of the second digital image 1008 and estimating camera parameters for the second digital image 1008. For example, the projection module 110 generates a rendering 1014 for display in the user interface 124 by projecting the group of vector graphics 1010 onto the second digital image 1008 and transforming the group of vector graphics 1010 using the three-dimensional mesh that approximates the second three-dimensional scene. In order to project the vertical vector graphic 1012 onto the second digital image 1008, the projection module 110 computes a vector that is normal to a portion of the second three-dimensional scene. The projection module 110 aligns a first axis of the vertical vector graphic 1012 with the vector and aligns a second axis of the vertical vector graphic 1012 with an additional vector that is tangent to the portion of the second three-dimensional scene. In one example, the projection module 110 transforms the group of vector graphics 1010 using piecewise non-linear transformations that do not rasterize vector graphics included in the group of vector graphics 1010.

Figure 11A:
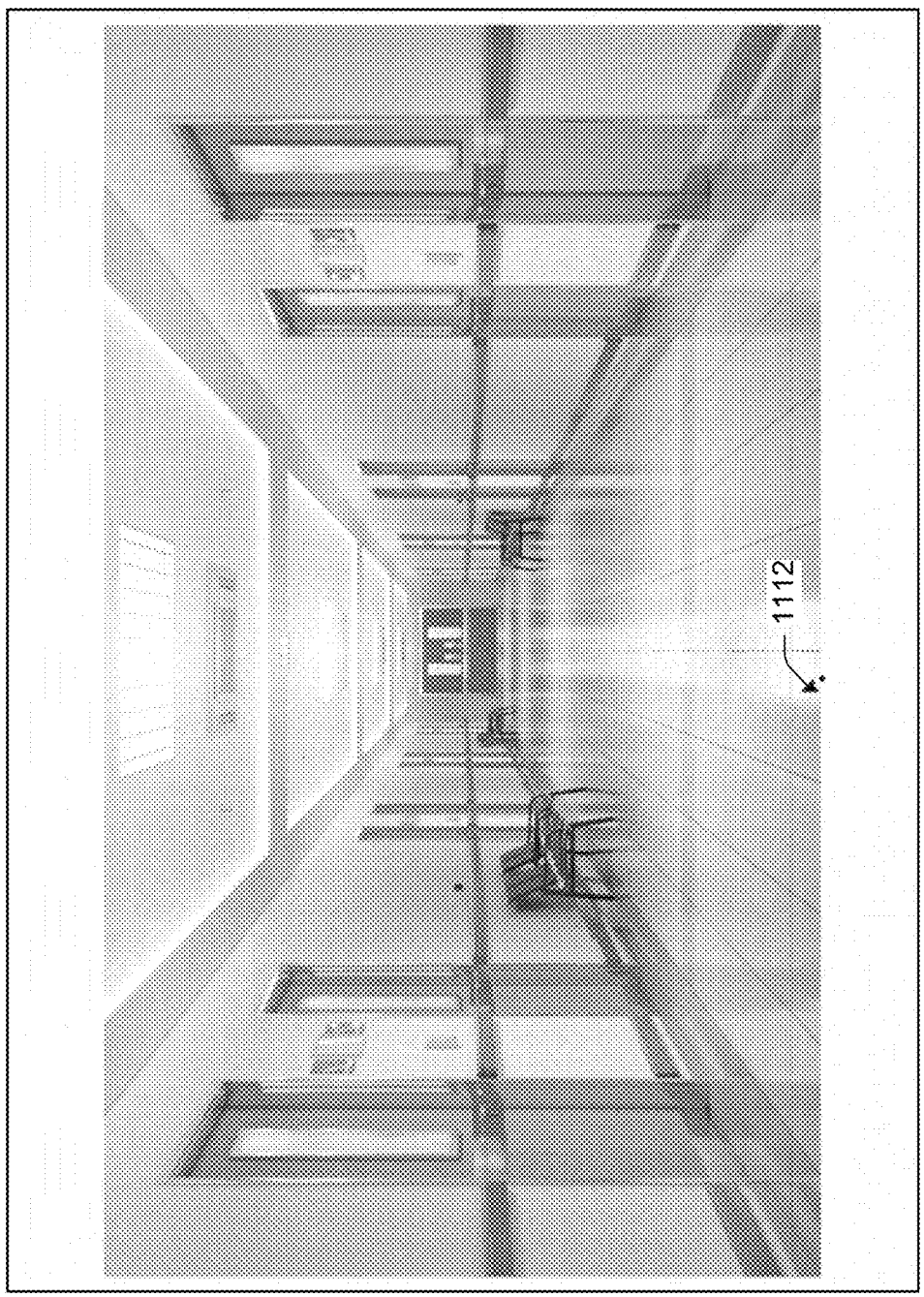
FIGS. 11A, 11B, 11C, 11D, 11E, and 11F illustrate an example user interface for visualizing vector graphics in three-dimensional scenes.
Figure 11C:
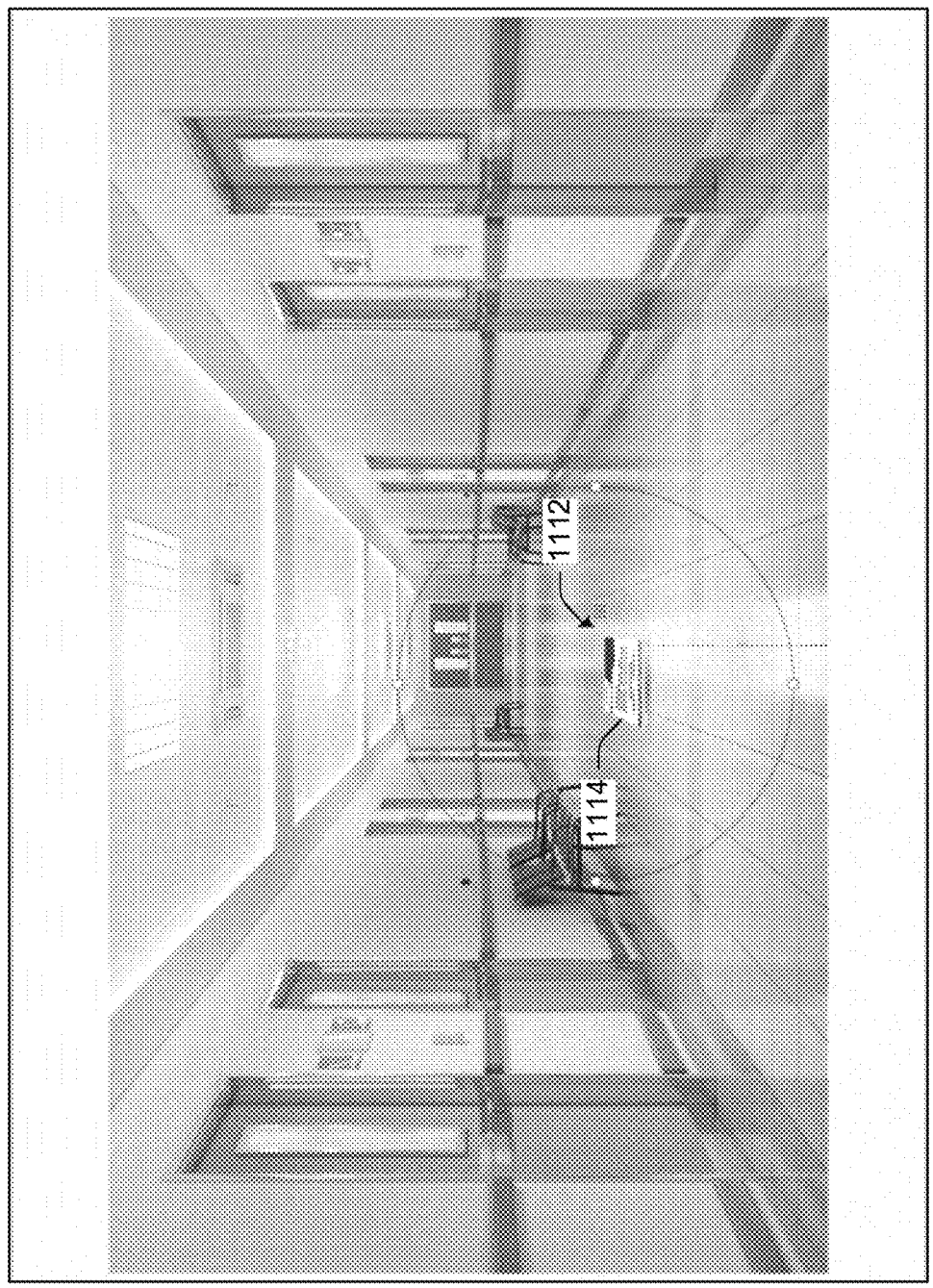
Figure 11D:
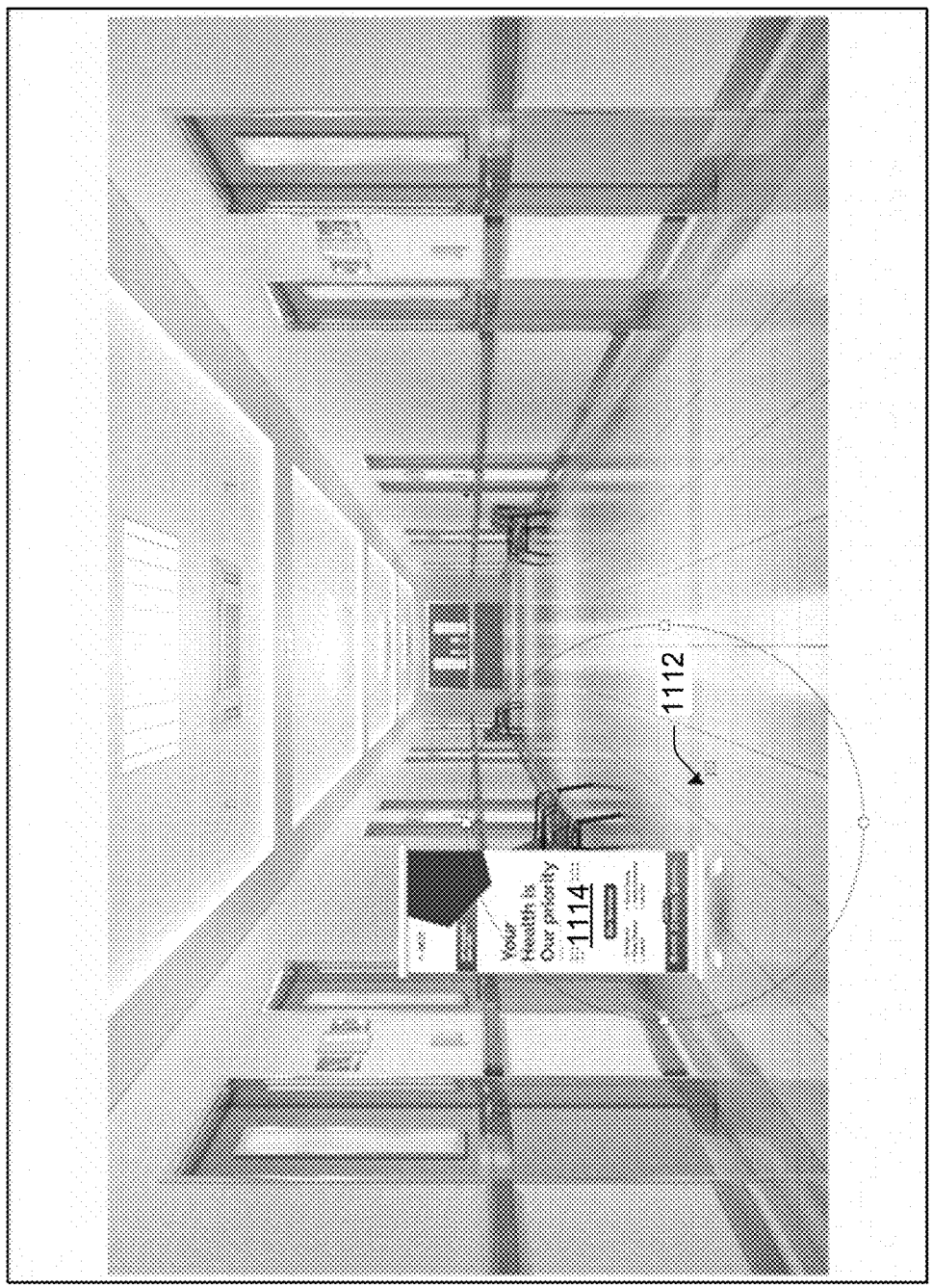
Figure 11E:
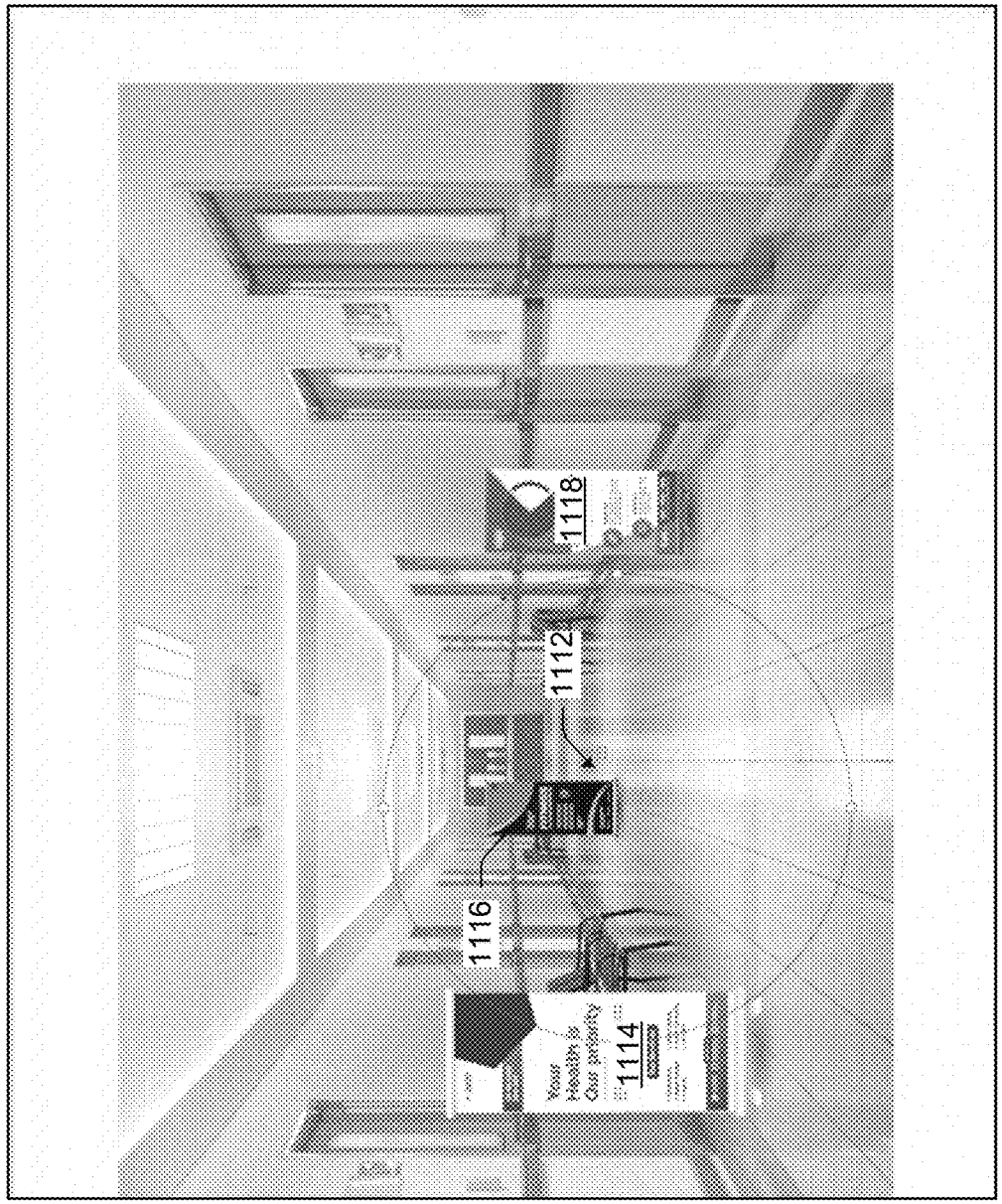
Figure 11J:

FIGS. 11A, 11B, 11C, 11D, 11E, and 11F illustrate an example user interface for visualizing vector graphics in three-dimensional scenes. FIG. 11A illustrates a representation 1100 of displaying a digital image depicting a three-dimensional scene. FIG. 11B illustrates a representation 1102 of projecting a vector graphic onto the digital image. FIG. 11C illustrates a representation 1104 of a horizontal alignment of the vector object with a portion of the three-dimensional scene. FIG. 11D illustrates a representation 1106 of a vertical alignment of the vector object with a portion of the three-dimensional scene. FIG. 11E illustrates a representation 1108 of projecting additional vector graphics onto the digital image. FIG. 11F illustrates a representation 1110 of an enlarged view of an additional vector object projected onto the digital image.

A shown in FIG. 11A, the three-dimensional scene depicted by the digital image is hallway in a perspective view. For example, the projection module 110 computes a three-dimensional mesh that approximates the three-dimensional scene depicted in the digital image by generating disparity values for pixels included in the digital image using the machine learning model and generating camera parameters for the digital image using the additional machine learning model. A user interacts with an input device (e.g., a stylus, a mouse, a keyboard, a touchscreen, etc.) relative to a user interface such as the user interface 124 to manipulate a cursor 1112 relative to the digital image that depicts the three-dimensional hallway. As part of this interaction, the user projects a vector graphic 1114 onto the digital image which is illustrated in the representation 1102 of FIG. 11B.

With reference to FIG. 11C, the user interacts with the input device to horizontally align the vector graphic 1114 with a floor of the hallway included in the three-dimensional scene. FIG. 11D illustrates a vertical alignment of the vector graphic 1114 with the floor of the hallway included in the three-dimensional scene. The user further interacts with the input device and manipulates the cursor 1112 relative to the digital image to project an additional vector graphic 1116 and an additional vector graphic 1118 onto the digital image. As illustrated in FIG. 11E, the additional vector graphic 1116 is vertically aligned with the floor of the hallway and the additional vector graphic 1118 is also vertically aligned with the floor of the hallway included in the three-dimensional scene.

For example, as the user interacts with the input device to manipulate the additional vector graphics 1116, 1118 relative to the digital image, the projection module 110 transforms the additional vector graphics 1116, 1118 using piecewise non-linear transformations based on the three-dimensional mesh that approximates the three-dimensional scene. These transformations do not rasterize the additional vector graphics 1116, 1118 which maintain resolution independence. This resolution independence is illustrated in FIG. 11F which depicts an enlarged view of the additional vector graphic 1116. As shown, small text of the additional vector graphic 1116 does not appear pixelated because of the resolution independence of the additional vector graphic 1116.

Example System and Device

Figure 12:
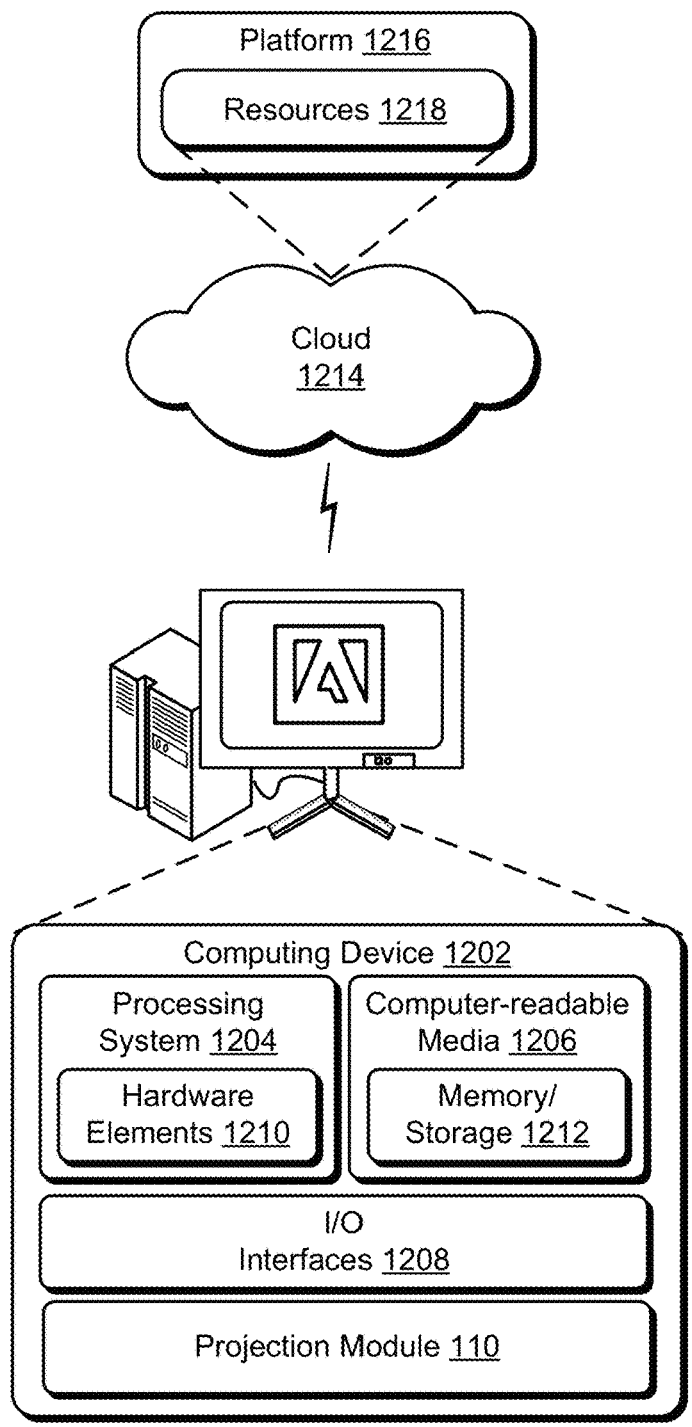
FIG. 12 illustrates an example system that includes an example computing device that is representative of one or more computing systems and/or devices for implementing the various techniques described herein.

FIG. 12 illustrates an example system 1200 that includes an example computing device that is representative of one or more computing systems and/or devices that are usable to implement the various techniques described herein. This is illustrated through inclusion of the projection module 110. The computing device 1202 includes, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interfaces 1208 that are communicatively coupled, one to another. Although not shown, the computing device 1202 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that are configured as processors, functional blocks, and so forth. This includes example implementations in hardware as an application specific integrated circuit or other logic device formed using one or more semiconductors. The hardware elements 1210 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1206 is illustrated as including memory/storage 1212. The memory/storage 1212 represents memory/storage capacity associated with one or more computer-readable media. In one example, the memory/storage 1212 includes volatile media (such as random access memory (RAM)) and/or nonvolatile media (such as read only memory (ROM), Flash memory, optical disks, magnetic disks, and so forth). In another example, the memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1210. For example, the computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supportable by various configurations of the computing device 1202 and are not limited to the specific examples of the techniques described herein. This functionality is also implementable entirely or partially through use of a distributed system, such as over a "cloud" 1214 as described below.

The cloud 1214 includes and/or is representative of a platform 1216 for resources 1218. The platform 1216 abstracts underlying functionality of hardware (e.g., servers) and software resources of the cloud 1214. For example, the resources 1218 include applications and/or data that are utilized while computer processing is executed on servers that are remote from the computing device 1202. In some examples, the resources 1218 also include services provided over the Internet and/or through a subscriber network, such as a cellular or Wi-Fi network.

The platform 1216 abstracts the resources 1218 and functions to connect the computing device 1202 with other computing devices. In some examples, the platform 1216 also serves to abstract scaling of resources to provide a corresponding level of scale to encountered demand for the resources that are implemented via the platform. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

CONCLUSION

Although implementations of systems for visualizing vector graphics in three-dimensional scenes have been described in language specific to structural features and/or methods, it is to be understood that the appended claims are not necessarily limited to the specific features or methods described. Rather, the specific features and methods are disclosed as example implementations of systems for visualizing vector graphics in three-dimensional scenes, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a processing device, input data describing a digital image depicting a three-dimensional scene and a vector graphic to be projected into the three-dimensional scene;
generating, by the processing device, a depth image by estimating disparity values for pixels of the digital image;
computing, by the processing device, a three-dimensional mesh that approximates the three-dimensional scene based on the depth image; and
projecting, by the processing device, the vector graphic onto the digital image by transforming the vector graphic based on the three-dimensional mesh.

2. The method as described in claim 1, wherein the three-dimensional mesh is computed based on two-dimensional points of a point cloud.

3. The method as described in claim 2, wherein the two-dimensional points of the point cloud are sampled from a density distribution generated based on the depth image.

4. The method as described in claim 3, wherein the density distribution is generated by computing differential density values at the pixels of the digital image.

5. The method as described in claim 1, further comprising subdividing the three-dimensional mesh using edge-length based subdivision.

6. The method as described in claim 1, wherein the vector graphic is transformed using a piecewise non-linear transformation.

7. The method as described in claim 1, further comprising:
computing a vector that is normal to a portion of the three-dimensional scene;
aligning a first axis of the vector graphic with the vector; and
aligning a second axis of the vector graphic with an additional vector that is tangent to the portion of the three-dimensional scene.

8. The method as described in claim 1, wherein the vector graphic is projected onto the digital image by compositing the vector graphic and the digital image.

9. The method as described in claim 1, further comprising estimating camera parameters for the digital image by estimating a horizontal field of view and a vertical field of view.

10. The method as described in claim 1, wherein the three-dimensional mesh is at least one of a triangle mesh, a quadrilateral mesh, or a polygon mesh.

11. A system comprising:
a memory component; and
a processing device coupled to the memory component, the processing device to perform operations comprising:
receiving input data describing a digital image depicting a three-dimensional scene and a vector graphic to be projected into the three-dimensional scene;
generating a point cloud of two-dimensional points based on the three-dimensional scene;
computing a three-dimensional mesh that approximates the three-dimensional scene based on the two-dimensional points; and
projecting the vector graphic onto the digital image by transforming the vector graphic based on the three-dimensional mesh.

12. The system as described in claim 11, wherein the vector graphic is transformed using a piecewise non-linear transformation.

13. The system as described in claim 11, wherein the point cloud is generated based on a depth image that includes an estimated disparity value for each pixel of the digital image.

14. The system as described in claim 11, wherein the vector graphic is projected onto the digital image using a UV mapping and an inverse of the UV mapping.

15. The system as described in claim 11, wherein the vector graphic is projected onto the digital image by compositing the vector graphic and the digital image.

16. A non-transitory computer-readable storage medium storing executable instructions, which when executed by a processing device, cause the processing device to perform operations comprising:
receiving input data describing a digital image depicting a three-dimensional scene and a vector graphic to be projected into the three-dimensional scene;
generating a depth image by estimating depth values for pixels of the digital image;
computing a three-dimensional mesh that approximates the three-dimensional scene based on the depth image; and
projecting the vector graphic onto the digital image by transforming the vector graphic based on the three-dimensional mesh.

17. The non-transitory computer-readable storage medium as described in claim 16, wherein the operations further comprise subdividing the three-dimensional mesh using edge-length based subdivision.

18. The non-transitory computer-readable storage medium as described in claim 16, wherein the operations further comprise estimating camera parameters for the digital image by estimating a horizontal field of view and a vertical field of view.

19. The non-transitory computer-readable storage medium as described in claim 16, wherein the three-dimensional mesh is computed based on two-dimensional points of a point cloud.

20. The non-transitory computer-readable storage medium as described in claim 16, wherein the vector graphic is transformed using a piecewise non-linear transformation.

* * * * *